Oct. 8, 1940.    W. F. LANGELIER    2,216,976
COLORIMETER
Filed Nov. 1, 1937    4 Sheets-Sheet 1

INVENTOR.
WILFRED F. LANGELIER
BY Oswald H. Milmore
HIS ATTORNEY.

Oct. 8, 1940.   W. F. LANGELIER   2,216,976
COLORIMETER
Filed Nov. 1, 1937    4 Sheets-Sheet 2

INVENTOR.
WILFRED F. LANGELIER
BY Oswald H. Milmore
HIS ATTORNEY.

Oct. 8, 1940.  W. F. LANGELIER  2,216,976
COLORIMETER
Filed Nov. 1, 1937  4 Sheets-Sheet 3
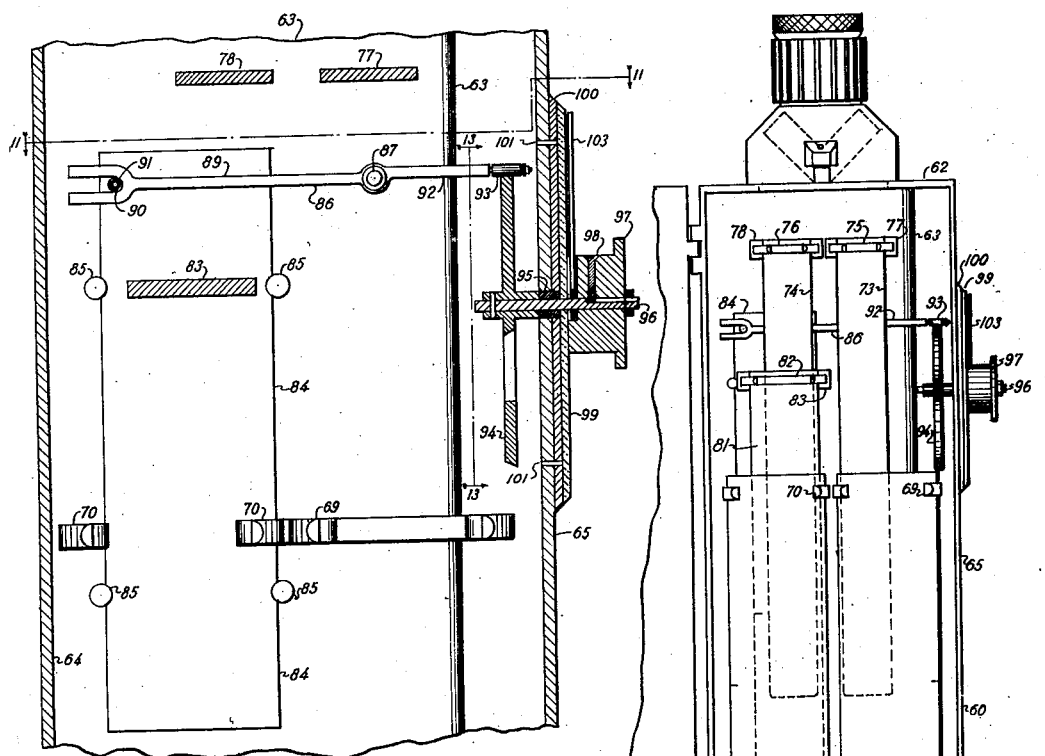
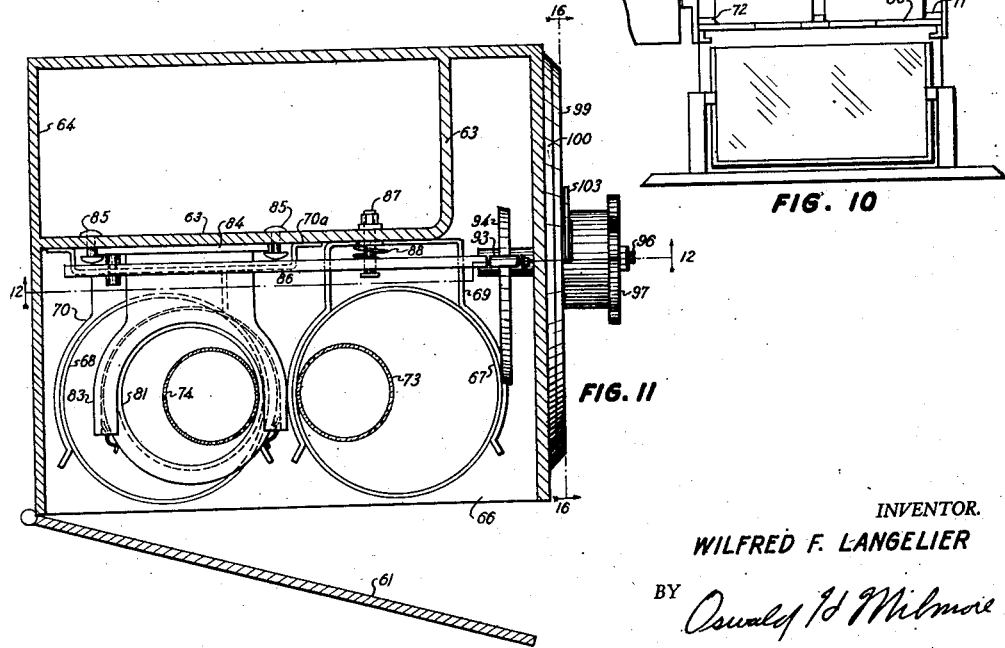
INVENTOR.
WILFRED F. LANGELIER
BY
HIS ATTORNEY.

Oct. 8, 1940.   W. F. LANGELIER   2,216,976
COLORIMETER
Filed Nov. 1, 1937   4 Sheets-Sheet 4

INVENTOR.
WILFRED F. LANGELIER

BY Oswald Td Wilmore

HIS ATTORNEY.

Patented Oct. 8, 1940

2,216,976

UNITED STATES PATENT OFFICE 2,216,976

COLORIMETER

Wilfred F. Langelier, Berkeley, Calif.

Application November 1, 1937, Serial No. 172,257

17 Claims. (Cl. 88—14)

This invention relates to colorimeters, and is primarily concerned with a colorimeter in which the color of an unknown is determined by comparison with two solutions of known colors. Such an instrument is known as a bicolorimeter.

In a bicolorimeter the color of the unknown solution is measured by viewing it by light passing through a predetermined depth of the solution, and comparing the color with that of the two solutions of known colors, which are contained in suitable vessels so arranged that they may be observed by transmitted light of the same intensity as that passing through the unknown, the total depth of the known solutions being equal to that of the unknown solution, and the relative depths of the known solutions being variable and measurable. Such a colorimeter may be employed whenever the color of the unknown is produced by coloring bodies which may assume two forms or shades, and the total concentration of such bodies in the unknown is determinable.

The colorimeter according to the present invention is particularly useful in, and is especially designed for, the determination of the pH or hydrogen ion exponent of water or other liquids, but may be employed or adapted for other uses. It is suitable for the determination of the pH without the use of buffer solutions, although it is understood that the use of buffer solutions therein is not excluded.

In the determination of the pH of an unknown solution, such as water, a measured quantity of an indicator which assumes a transition shade at the pH of the unknown is added thereto. When the expected pH of the solution is not known, several indicators are successively added until one is found which assumes such a shade, and the latter is employed, using a fresh sample of the unknown. The shade assumed by the indicator is then compared with a standard, which may be in the form of a translucent material carrying a pigment, it being usually necessary to provide a series of such materials of varying shades; or a series of buffered solutions of fixed pH containing the same indicator in the same concentration may be employed. According to still another method, the shade is compared with a combination of two solutions, each containing the indicator in the same concentration as the unknown, one having the indicator fully transformed into the acid form, and the other having the indicator fully transformed into the basic or alkaline form, thereby providing a standard solution having a known color corresponding to extreme acidity, and a second standard solution having a color corresponding to extreme alkalinity. These standard solutions are juxtaposed so as to cause a ray of light to pass therethrough, the total depth of the two solutions interposed in the path of the light being constant and equal to the depth of the unknown solution, and the relative depths of these two solutions being adjustable, whereby the color of the unknown solution can be matched by a combination of the depths of the standard solutions. The present invention is particularly concerned with the last described method of measuring the assumed shade of the solution of the indicator in the unknown.

The theoretical basis for the two-solution system of colorimetry contemplated according to the present invention is known. It is that indicators behave like weak acids or weak bases, the dissociated and undissociated forms of which have different colors and forms, and that the color which is observed by transmitted light depends upon the relative concentrations of the dissociated and undissociated forms of the indicator. The condition of equilibrium in the solution is determined by the pH of the unknown, and the color assumed by the solution resulting from the addition of a small quantity of the indicator to the unknown is, therefore, a measure of its pH.

In general, such a solution of the unknown containing an indicator which assumes a transition shade at the pH of the unknown, will contain a certain concentration of the indicator in the acid form and a certain concentration of the indicator in the alkaline form, the sum of these concentrations being equal to the concentration of the indicator added. The relationship between these two concentrations establishes the equilibrium conditions and the pH of the unknown. This relationship is, according to the present invention, readily determined by measuring the relative depths of juxtaposed standard solutions, as described above, which will yield a color by transmitted light equal to that of the color by transmitted light of the indicator solution in the unknown.

The relationship between the equilibrium condition of the indicator and the pH of the unknown has been described in the scientific literature, and it is unnecessary to present a detailed discussion thereof in this specification, beyond presenting the equations upon which the calibration of the instrument depends. Quantitatively, in the case of an indicator the undissociated form of which has acid properties, the equilibrium is governed by the following equation, derivable from the equation for the law of mass action:

$$\frac{[H^+][I^-]}{[HI]} = K_I \quad (1)$$

wherein [H+] represents the concentration of hydrogen ions in the solution, [I−] represents the concentration of the basic or alkaline form of the indicator (which has the alkaline color), [HI] represents the concentration of the undissociated form of the indicator (which has the acid color), and $K_I$ is the ionization constant of the indicator, known and referred to herein as the indicator constant.

Similarly, in the case of an indicator the undissociated form of which has alkaline properties, the equilibrium is governed by the equation:

$$\frac{[I^+][OH^-]}{[IOH]} = K_{IOH} \quad (2)$$

wherein [I+] represents the concentration of the acid form of the indicator (which has the acid color), [OH−] represents the concentration of the hydroxyl ions [IOH] represents the concentration of the undissociated form of the indicator (which has the alkaline color), and $K_{IOH}$ is the ionization constant. In the case of an indicator of this type the indicator constant is defined by the equation:

$$\frac{K_W}{K_{IOH}} = K_I \quad (3)$$

wherein $K_W$ is the ionization product of water, and $K_I$ is the indicator constant.

In either type of indicator, the color assumed in a solution is fixed by the ratio of the concentrations of the alkaline and acid forms. Moreover, for either type, this ratio is equal to the ratio:

$$\frac{K_I}{[H^+]}$$

so that the hydrogen ion concentration may be expressed by the equation:

$$pH + \log \frac{[\text{alkaline form}]}{[\text{acid form}]} + pK_I \quad (4)$$

wherein pH is the hydrogen exponent or hydrogen ion exponent, and is equal to −log [H+]; [alkaline form] represents the concentration of the alkaline form of the indicator, i. e., [I−] in the case of the first type of indicator described above, and [IOH] in the case of the second type of indicator; [acid form] represents the concentration of the acid form of the indicator, i. e., [HI] in the case of the first type of indicator, and [I+] in the case of the second type of indicator; and $pK_I$ is a constant dependent upon the indicator constant, defined by the relationship:

$$pK_I = -\log K_I \quad (5)$$

all logarithms being common logarithms. It should be noted that the value $pK_I$ varies with the temperature, and also with the electrolyte content of the solution.

It is an object of the present invention to provide a device for conveniently determining the hydrogen ion concentration or pH of an unknown solution, by providing means for bringing two solutions consisting entirely or predominantly of the indicator in its acid and alkaline forms, respectively, into juxtaposition in any desired ratio of depths and means for expressing this ratio of depths in a form which will permit a simple determination of the pH. It is a further object to provide a colorimeter for comparing the color of an unknown with a pair of solutions of known colors in which the color of the juxtaposed solutions may be easily compared with the color of the unknown in a single eye piece, and in which the optical system is simplified. A further object is to arrange the vessels containing the solutions in the colorimeter so as to facilitate the removal of the vessels therefrom for changing solutions, and to permit their replacement with a minimum of adjustment. Another object is to provide means for making a simple compensation for the turbidity or natural color of the unknown. A still further object is to provide a dial which will permit the direct reading of the pH without the necessity of calculations. The present invention further contemplates a mechanical arrangement for varying the relative depths of two solutions of standard colors by means of an actuating-indicating means the position of which is a linear function of the pH. Other objects of the invention will appear from the following specification, taken in connection with the drawings forming a part thereof, which illustrate representative embodiments thereof, in which:

Figure 10 is a rear elevational view of a modified form of the colorimeter;

Figure 11 is a sectional plan view of the colorimeter shown in Figure 10, taken along line 11—11 of Figure 12;

Figure 12 is a fragmental vertical sectional view taken along line 12—12 of Figure 11;

Figures 1, 2, 3, 4:
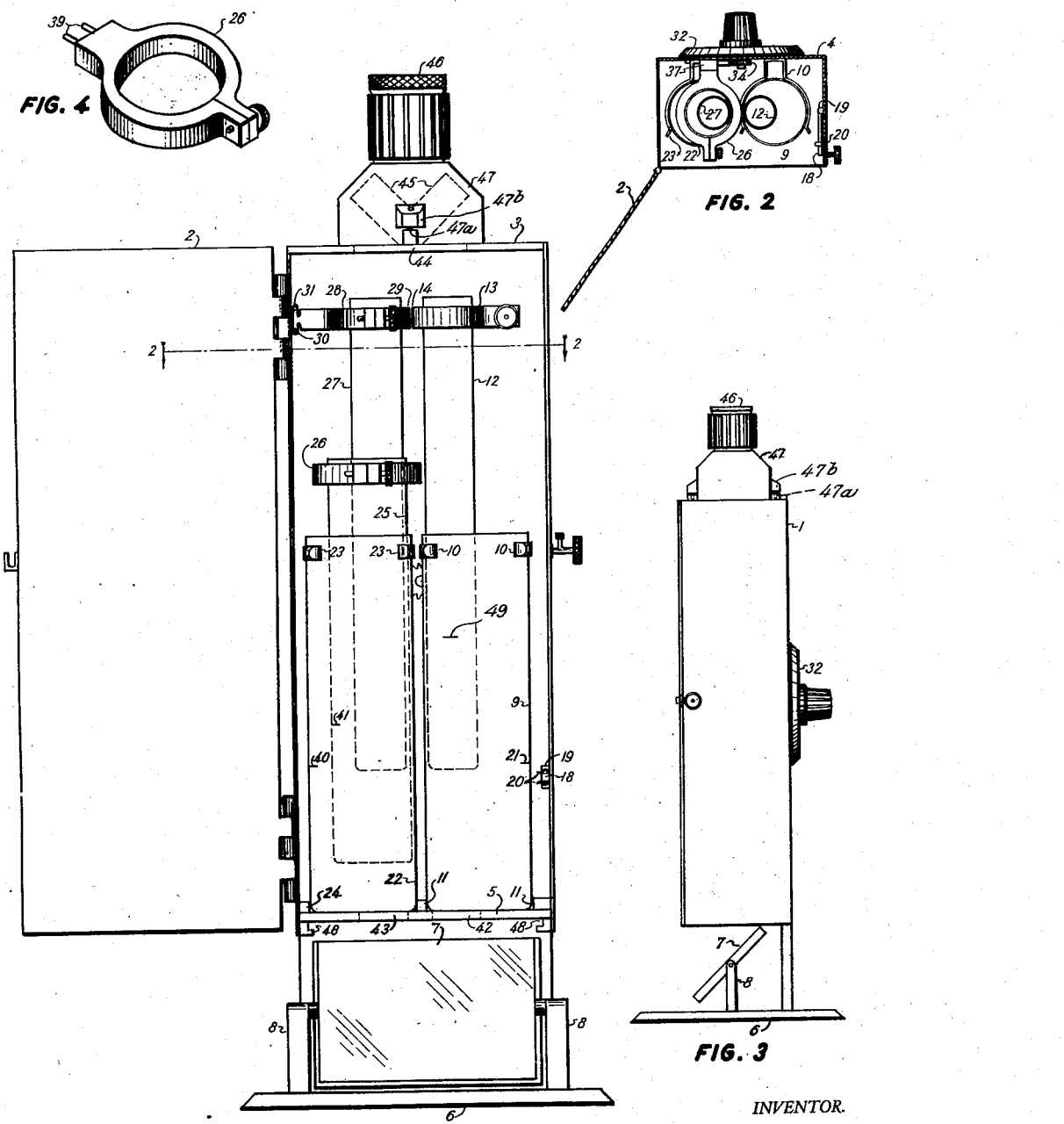
Figure 1 is a rear elevation view of the colorimeter.
Figure 2 is a sectional plan view, taken along line 2—2 of Figure 1.
Figure 3 is a side elevational view of the colorimeter.
Figure 4 is a perspective view of the clamp for supporting the movable cup.
Figure 5:
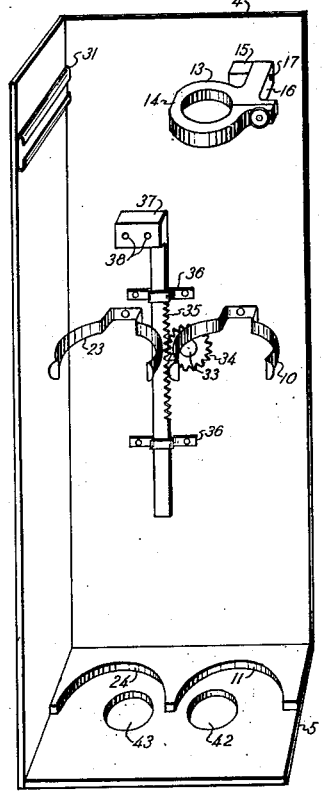
Figure 5 is a rear perspective view of the cabinet of the colorimeter, with the cups, top and one side wall removed therefrom.

Referring to the drawings, and particularly to Figures 1 to 7, the colorimeter comprises a cabinet 1, provided with a hinged door 2, and with a ceiling 3, a front wall 4, and floor 5, constructed to exclude light from the interior save through apertures in the floor. The cabinet is supported by a base 6, carrying a reflector 7, hingedly supported by a pair of legs 8.

A cup 9, having a flat translucent bottom, such as a glass test tube with a flat floor, and adapted to contain the unknown solution, is removably mounted within the cabinet by means of a resilient clamp 10, secured to a wall of the cabinet, the cup normally resting on the floor 5 and abutting a positioning plate 11 which has an outline to fit the cup 9. A second cup 12, also having a flat, translucent bottom, is mounted telescopically within and eccentrically with respect to the cup 9 at a predetermined distance above the bottom thereof, by means of a clamp 13. This clamp is provided with a flat facet 14 facing the center of the cabinet, whereby the eccentric mounting of the cup 12 is facilitated. The clamp 13 is pivotally supported on a cleat 15 by means of a rearwardly extending lug 16 and a horizontal pin 17, the cleat 15 being attached to the front wall 4 of the cabinet.

A spacing bar 18 is secured to the side wall of the cabinet by a hinge 19 having a vertical axis of rotation. The upper surface of the spacing bar is spaced from the top of the floor 5 by a distance equal to the depth through which it is desired to observe the unknown solution. This distance is hereinafter designated as the observing depth. The bar 18 is normally positioned along the side wall, as shown in Figures 1 and 2, being retained by a detent clasp 20.

A convenient observing depth is 5 cm., although other depths, preferably between 2 and 10 cm., may be employed. As a result of using an observing depth of several centimeters it is possible to add a smaller quantity of the indicator than is practical in the usual methods of colorimetry, in which the unknown is observed through a lesser depth. The use of very low concentrations of indicator is advantageous because it reduces the errors caused by the fact that the pH of the indicator is usually not the same as that of the unknown. When working with unbuffered unknowns, such as water, errors due to this cause may often be too great to be neglected, unless extremely low concentrations of the indicator are used.

To adjust the positions of the cups when assembling the instrument, as when one or both of the cups are being replaced, or the cup 12 has been removed from its clamp 13, the cup 9 is placed around the cup 12 and slid upwardly above the level of the bar 18, which is then swung beneath the cup, assuming a position perpendicular to the side wall. The cups 9 and 12 are then lowered, the former resting on the spacing bar, and the bottom of the latter resting on the floor of the cup 9. The clamp 13 is then tightened, the spacing bar is returned to its position adjacent the wall of the cabinet, and the cup 12 is slid downwardly to rest on the floor 5. The cups are then in the correct relative positions.

To fill the cup 9 or to change the solution therein, the cup is pulled outwardly out of engagement with the clamp 10, whereby both cups swing about the pin 17, until the cup 9 is clear of the floor of the cabinet, from which position it may be lowered and withdrawn from the instrument. It is filled to a level slightly higher than the observing depth, which level may be indicated in the case of a glass cup by a mark 21, raised about the cup 12, pushed back into engagement with the clamp 10 and the edge of the positioning plate 11, and slid downwardly to insure its proper seating on the floor. The adjustment of the cup 12 is not disturbed thereby. It will be noted that this arrangement permits the rapid removal of the cup 9 for changing from successive unknowns without necessitating the removal or readjustment of the position of the cup 12.

A cup 22, adapted to contain one of the standard solutions which, in the embodiment shown, is the solution containing the indicator transformed to the alkaline form, having a flat, translucent floor, is removably secured to the cabinet by means of a resilient clamp 23 and a positioning plate 24, resting on the floor 5. A telescoping cup 25 having a flat translucent bottom, and adapted to contain the other standard solution which, in the embodiment shown, is the solution containing the indicator transformed to the acid form, is eccentrically and telescopically mounted within the cup 22 by means of a clamp 26, described below. A third telescoping cup 27, also having a flat translucent bottom, so as to function as a translucent plunger dipping into the solution in the cup 25 is mounted in fixed relation to the bottom of the cup 22 by means of a clamp 28, provided with a flat facet 29 adjacent the face 14 of the clamp 13. The clamp 28 is removably attached to the adjacent cabinet wall by means of a T-shaped lug 30, slidably supported by a slotted track 31 attached to the wall, whereby the vertical position of the clamp 28 with respect to the floor 5 is fixed.

A dial 32 on the front of the cabinet is mounted on a shaft 33, journaled in the front wall of the cabinet. The shaft carries a spur gear 34, engaging a rack 35, secured to the wall by means of cleats 36. The rack 35 carries a block 37, provided with holes 38, shaped to frictionally engage resilient prongs 39 on the clamp 26. The rack and gear are so constructed as to move the block 37 through a vertical distance equal to the observing depth when the dial 32 is rotated through a desired, predetermined arc, marked thereon. This arc may correspond to one revolution, or may be either greater or less than 360°; in the embodiment shown, it is 330°, and the limits thereof are indicated by the marks a and b.

To assemble and adjust the cups, the cup 25 is loosely attached to the clamp 26 and placed within the cup 22. The cup 27 is similarly loosely attached to the clamp 28 and placed in the cup 25. The assembly is slid into the cabinet. While sliding it into position, the clamp 28 is engaged with the track 31; the clamp 26 is then guided by hand to engage the prongs 39 with the block 37, whereby the clamp 26 is supported by the gear and rack 34, 35. The dial 32 is rotated until the mark a is opposite the reading index c on the front wall 4 of the cabinet, and the cup 25 is lowered until it rests on the floor of the cup 22. The clamp 26 is then tightened. The dial is next rotated until the graduation mark b is opposite the reading index c, and the clamp 28 is tightened while the bottom of the cup 27 is in engagement with the floor of the cup 25.

To fill the cups 22 and 25, the clamp 26 is disengaged from the block 37, and the three cups slid outwardly. The cups 22 and 25 are filled to levels slightly in excess of the observation depths; and the three cups are reassembled and slid into the cabinet as described above. The vertical adjustments of the clamps 26 and 28 and of the cups 22, 25, 27 will not be disturbed thereby. The cups 22 and 25 may be provided with graduation marks 40 and 41 to aid in filling to the proper levels. When all cups are properly filled, the door 2 is closed to exclude light.

The optical system comprises: the reflector 7; a pair of apertures 42 and 43 of equal sizes in the floor 5 located below the cups 12 and 27 and of the same diameter as these cups or slightly larger; an elongated hole 44 in the ceiling 3 of the cabinet, extending over the cups 12 and 27; a pair of prisms 45; and an eye piece 46. The eye piece is frictionally secured to a support 47 which houses and supports the prisms 45, the support being attached to the cabinet by a pair of resilient prongs 47a extending downwardly from protrusions 47b on the front and rear of the support (see Figure 3). The prisms are located to translate the rays of light passing upwardly through the cups, so that the light from the cup 12 occupies one half of the field of vision, and the light from the cup 27 the other half. Suitable lenses are mounted in the eye piece.

It should be noted that the eccentric locations of the cups in the cabinet permit the cups 12 and 27 to be mounted relatively close together, thereby simplifying the optical system, and permitting smaller prisms to be employed.

A pair of channel bars 48 below the floor 5 are adapted to receive a slide containing a colored glass. The use of such a color filter is advantageous with some indicators.

The graduations on the dial 32 are symmetrical about the zero mark $d$, which is midway between the marks $a$ and $b$, and which is opposite the mark $c$ when the cup 25 is in its midway position. The dial is graduated according to the equation:

$$R = \log\left(\frac{1-x}{x}\right) \qquad (6)$$

wherein $x$ is the distance between the bottom of the cup 27 and the upper face of the bottom of the cup 25 at any position of the dial, divided by the observing depth; and R is the corresponding reading or graduation on the dial for the point opposite the reading mark or index $c$.

It will be evident that the ratio of $(1-x)$ to $x$ in Equation 6 is equal to the ratio of the depth of the solution in the cup 22, containing the indicator in the alkaline form, to the depth of the solution in the cup 25, containing the indicator in the acid form, through which the light from the aperture 43 must pass. The value R, therefore, is equal to the first member of the second term of the Equation 4.

If, therefore, the concentration of the indicator in the unknown in the cup 9, and in the solutions in the cups 22 and 25 is the same, the pH of the unknown may be determined by the equation:

$$pH = R + pK_I \qquad (7)$$

wherein R is the reading on the dial when the colors on both sides of the field of vision in the eye piece are the same.

To determine the pH of an unknown, a suitable indicator the constant $K_I$ or $pK_I$ of which is known, is selected, and small quantities thereof are added to the unknown in the cup 9, and to liquid in the cups 22 and 25. If the unknown is water, water may be employed in the cups 22 and 25. The amount of indicator is selected so as to cause its concentration in all three cups to be the same. The liquid in the cup 25 is acidified to transform the indicator to the acid form, as by the addition of a few drops of a strong mineral acid like HCl, and the liquid in the cup 22 is made alkaline by adding a mineral base like NaOH. The cups are placed into the instrument, the reflector 7 adjusted to throw a beam of light through the holes 42 and 43, and the dial is rotated until the colors on both sides of the field of vision in the eye piece are matched. The reading on the dial is then added algebraically to the $pK_I$ for the indicator.

For example, in the device illustrated, the reading is $-0.22$. If the indicator has a constant $K_I = 6.8 \times 10.9$, or $pK_I = 8.17$, the pH of the unknown is determined by adding $-0.22$ to 8.17, the answer being 7.95. For successive unknowns of approximately the same pH, the standard solutions may be re-used, it being only necessary to change the liquid in the cup 9.

When the unknown is turbid, or possesses natural color, this may be compensated by placing a small quantity of the unknown, but without adding an indicator thereto, in the cup 27, to a level equal to the observing depth. A graduation 49 may be provided for this purpose. It will be noted that it is possible to change the liquid in the cup 27 easily without disturbing the adjustment of the cup with respect to its clamp and to the cup 22.

Figure 9:
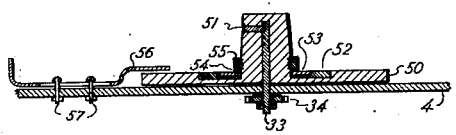
Figure 9 is a sectional view taken on line 9—9 of Figure 8.
Figure 6:
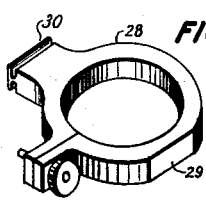
Figure 6 is a perspective view of the clamp for supporting one of the fixed telescoping cups.
Figure 8:
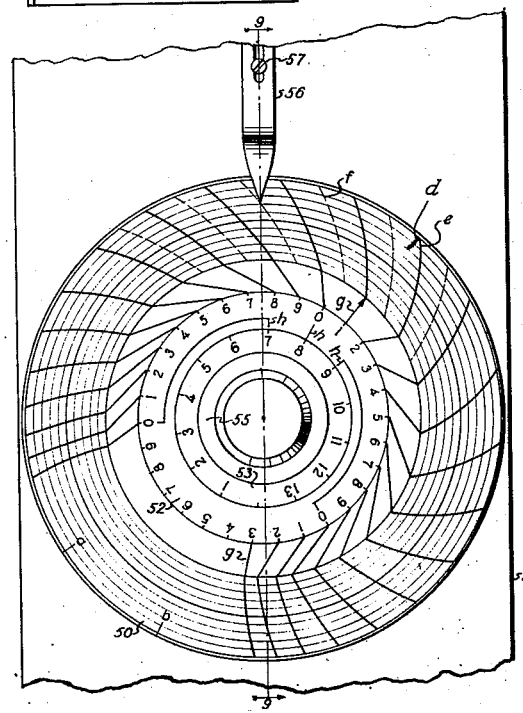
Figure 8 is a view similar to Figure 7, showing a modified form of the dial, adapted for the direct reading of the pH.

The dial may be constructed so as to perform the addition of the reading and the value $pK_I$, thereby making it possible to read the pH directly. Such a dial is illustrated in Figures 8 and 9. It comprises a circular base 50, having a central hole for receiving the shaft 33, and a set screw 51 for securing the same. An annular disc 52 is rotatably mounted in an annular recess on the face of the base 50 and is surmounted by a smaller annular disc 53, held in position by a shim 54 and a knurled threaded nut 55.

A pointer 56 is mounted on the front wall 4 of the cabinet by means of the bolts 57 passing through an elongated slot in the pointer, whereby the pointer can slide vertically.

The annular area of the base 50 surrounding the disc 52 carries eleven concentric circles. The first and eleventh (inner and outer) circles are similarly subdivided by points corresponding to even tenths of the value of R according to Equation 6. Thus, the dial illustrated in Figure 8 was constructed by solving the Equation 6 to obtain a series of values of $x$ which correspond to the following values of R: $-1.20$, $-1.10$, $-1.00$, $-0.90$, ... etc., up to $+1.20$. Points corresponding to values of R from $-1.10$ to $+1.20$ were marked on the inner circle similarly to Figure 7, i. e., the dial was rotated to cause the movable cup 23 to have the position for which $x$ is equal to the particular value of $x$ being plotted, and a graduation was made on the dial on the inner circle opposite the pointer 56. The magnitudes of the values of R were not, however, indicated on the base 50. It will be noted that when $R = 0.00$, $x = 0.500$; this point is at the middle of the scale, opposite the index mark $d$. The outer circle was similarly graduated, with the difference that points corresponding to values of R from $-1.20$ to $+1.10$ were plotted. The intermediate circles are also calibrated by the Equation 6, but the points thereon correspond to intermediate values of R, as follows: On the second circle (adjacent the inner circle) the points correspond to values of R equal to an even tenth plus 0.09 (or $-0.01$); on the third circle, to values of R equal to even tenths plus 0.08 (or $-0.02$), etc., so that the points on the tenth circle (adjacent the outer circle) correspond to values of R equal to even tenths plus 0.01 (or $-0.09$). Thus, in graduating the second circle of the dial illustrated, the Equation 6 was solved to obtain a series of values for $x$ for which R had the values: $-1.11$, $-1.01$, $-0.91$, ... etc., up to $+1.19$, and these points were plotted on the second circle in the manner described above. Heavy curves $e$ join points on the concentric circles as shown. For ease in interpolating, additional lighter curves $f$ are placed intermediate some of the curves $e$. These correspond to values of R differing by 0.05 from those indicated by the solid curves $e$.

The annular portion of the disc 52 surrounding the disc 53 is uniformly subdivided into thirty subdivisions, 12° apart, numbered three times consecutively from 0 to 9, to indicate even tenths in the readings. Lines $g$ on the base 50 connect the inner termini of the heavy curves $e$ to the equally spaced numbers on the disc 52. By rotating the disc 52 with respect to the base 50 it is possible to indicate the curves $e$ by any number from 0 to 9.

The annular disc 53 carries numbers from 1 to 13, uniformly spaced about the circumference to indicate units in the reading. The lines $h$ on the disc 52 join the three 0's thereon to three adjacent numbers on the disc 53. By rotating the disc 53 with respect to the disc 52, it is possible to indicate the 0's on the latter by any three consecutive numbers from 1 to 13.

Figure 7:
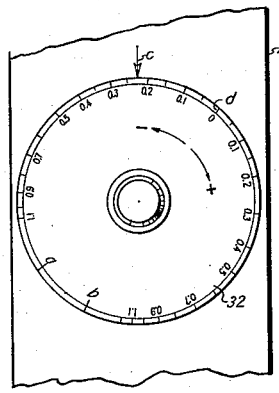
Figure 7 is a fragmental elevation view of the front of the colorimeter showing the dial.

The marks $a$, $b$ and $d$ are the same as for the dial 32 shown on Figure 7.

To use the dial, it is adjusted by means of the set screw 51 to cause the mark $d$ to be opposite the pointer 56 when the cup 25 is in its midway position, as in the dial according to Figure 7. With the dial in this position, the discs 52 and 53 and the pointer 56 are adjusted to yield a reading equal to $pK_1$ for the indicator employed. For example, when cresol red, having a $pK_1$ value of 8.17 is employed, the disc 52 is moved to cause the number 1 (corresponding to the tenths) to be joined by a line $g$ to the line $e$ which intersects the inner circle opposite the mark $d$; the disc 53 is moved to cause the unit number 8 to be joined by a line $h$ to the 0 on the disc 52 next to the left of the said number 1; and the pointer 56 is moved radially to point to a circle on which the value 8.17 is read to the nearest hundredth. This circle is found to be the eighth circle (seventh from the inner circle). These adjustments are shown on Figure 8, save that the dial is not positioned with the index mark opposite the pointer 56.

Referring to Figure 8, it will be observed that when the dial is turned counter-clockwise to bring the mark $d$ under the center line of the pointer 56, the tip of the pointer will indicate 8.17 as follows: The heavy curve $e$ which in that position appears to the left of the pointer indicates the first two digits of the number, i. e., 8.1, the digit 8 being read on the innermost disc 53, and the digit 1 being read on the annular disc 52. The last digit 7 is interpolated along the eighth circle between the aforesaid heavy curve $e$ and the adjacent curve $e$ to the right of the pointer. These adjustments for the discs 52 and 53 and for the pointer 56 having been made, they are not changed so long as the same indicator or an indicator having the same constant is employed.

To determine the pH of an unknown the cups are filled and the dial is rotated as described above in connection with Figure 7 so that the color on each side of the field of vision in the eyepiece is the same. When this setting of the dial has been obtained the pH may be read thereon directly. For example, when the final position of the dial is as shown in Figure 8, the pH is read as 7.95. This is read at the tip of the pointer on the eighth circle as follows: The first two digits of the pH, i. e., 7.9 are indicated by the heavy curve $e$ to the left of the pointer, these digits being given by the discs 53 and 52. The last digit 5 is interpolated between the aforesaid heavy curve $e$ and the heavy curve $e$ to the right of the pointer, the latter curve having the value 8.0.

Any number of unknowns may be tested with the same indicator and with the same adjustments of the discs 52, 53 and the pointer 56. When an indicator having a different constant is employed the angular positions of the discs 52 and 53 with respect to the base 50, and the radial position of the pointer 56 must be altered so that the value of the indicator constant is read at the tip of the pointer when the dial is positioned to cause the mark $d$ to be in line with the pointer 56 as explained above.

It should be noted that the lines $g$ and $h$ and the discs 52 and 53 are merely for the purpose of facilitating the reading of the units and tenths in the value of the pH, and that either or both of these discs may be omitted without destroying the utility of the curves $e$ and the pointer 56, since it is possible for the operator to remember the units and the tenths. It should also be noted that the dial according to Figures 8 and 9 may also be used in the manner described for the dial 32, using only the first or eleventh circle. Moreover, the graduations of the dials 32 and/or 50 need not be inscribed on a circular dial, it being possible to employ any other shape of scale, without departing from the spirit and scope of the invention.

A modification of the colorimeter is illustrated in Figures 10 to 16, differing from the form described above in the manner of mounting the cups, and in the mechanical arrangement for varying and reading the position of the movable cup. Referring to these figures, the apparatus comprises a cabinet 60, provided with a door 61, a ceiling 62, a partition wall 63, side walls 64 and 65, and a floor 66. The floor and ceiling are provided with apertures, as described in connection with Figures 1 to 7, and the optical system is the same.

A pair of cups 67 and 68, similar to the cups 9 and 22, is removably mounted within the cabinet by means of resilient clamps 69 and 70, resting on the floor 66, against positioning plates 71 and 72, adapted to contain the unknown solution and the solution containing the indicator transformed to the alkaline form, respectively. The clamp 70 is attached to the wall 63 through a stirrup 70a (see Figure 11) which spans the slide 84, described below. A pair of smaller telescoping cups 73 and 74, corresponding to the cups 12 and 27, respectively, are mounted within the cups 67 and 68 and eccentrically thereto, as shown. They differ from the cups heretofore described in that they are provided with annular flanges or beads 75 and 76 at their upper ends, which may be integral with the cups, or may be in the form of metallic bands fitted thereto. A pair of horizontal supporting bars 77 and 78 are fixed to the partition wall 63, and are provided at their ends with channelled sockets 79 to receive the flanges of the cups, as shown more particularly in Figure 14. Leaf springs 80 may be provided to retain the cups removably in the supporting bars.

The sizes of the cups and the locations of the bars 77 and 78 are such that the cups are always in the proper relative positions, as described above in connection with Figures 1 to 7. Thus, the vertical distance between the bottom of the cup 73 and the upper surface of the floor of the cup 67 is equal to the observing depth; and the distance between the bottom of the cup 74 and the upper surface of the floor of the cup 68 is equal to the observing depth plus the thickness of the floor of the movable cup 81, described below.

Figure 14:
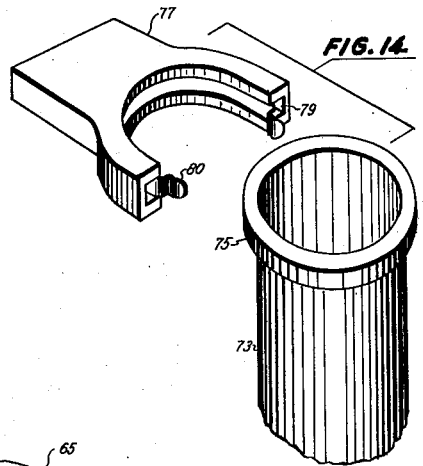
Figure 14 is a perspective view of a portion of a cup and of the supporting bar.

The movable cup 81 is telescopically mounted between the cups 68 and 74, and is similarly provided with a flange or bead 82, engageable with a supporting bar 83, constructed similarly to the bar 77, shown in Figure 14. The bar 83 is attached to a slide 84, secured to the wall 63 by means of studs 85, and vertically slidable with respect to the wall.

A lever 86 is pivotally supported by the partition wall 63 by means of a shaft 87, provided with a spring 88 arranged to raise the longer arm 89 nearest the movable cup, and of sufficient stiffness to raise the movable cup, together with its slide and supporting bar and to overcome friction. The longer arm 89 has a bifurcated end, engaging a roller 90, surrounding a pin 91 on the slide 84. The shorter arm 92 carries a roller 93, constantly urged to engagement with a cam 94 by the action of the spring 88. The lever 86 is shaped to cause the centers of the pin 91 and the shaft 87 to be in line with the lower edge of the roller 93. Any convenient ratio of lengths of lever arms may be employed, and the arms may be of equal lengths. It is, however, generally desirable to magnify the action of the cam 94, and I prefer to locate the shaft 87 nearer to the cam than to the pin 91, as shown.

The wall 65 is provided with a bushing 95, which houses a shaft 96 carrying the cam 94 at one end, and a knob 97, at the other end. The knob 97 is provided with a set screw 98, which fits into a groove in the shaft for properly orienting the knob when the latter is loosened or removed for re-orienting or reversing the graduated disc. The knob 97 carries a transparent disc 99 having a reading line $k$. A graduated disc 100 is mounted around the bushing 95 between the wall 65 and the disc 99, being secured against rotation by means of a pair of orienting pins 101 on the outer surface of the wall 65, and entering holes 102 in the disc 100. The disc 100 is opaque, and may be graduated on both sides, as described below.

Figure 15:
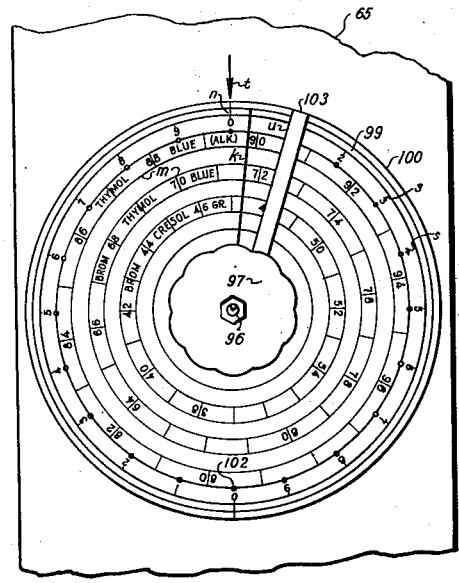
Figure 15 is a fragmental side elevational view of the colorimeter showing the reading discs.

As shown in Figure 15, the obverse of the disc 100 is marked with a plurality of concentric circles $m$, one circle being provided for each of the most commonly used indicators. Any uniform scale may be used for the calibration of these circles, as discussed below. In the embodiment shown, these circles are calibrated uniformly so that 1.0 unit of pH corresponds to an arc of 180°, whereby a spread of two units of pH may be read. The origin of these graduations is a vertical line $n$, and the graduation at the line $n$ corresponds to the $pK_1$ value for the indicator in question at the ionic strength of electrolytes most commonly encountered in the laboratory in which the instrument is to be employed, and for the temperature to be used. The reverse of the disc may be similarly graduated for other conditions or indicators, the graduations increasing clockwise.

Figure 13:
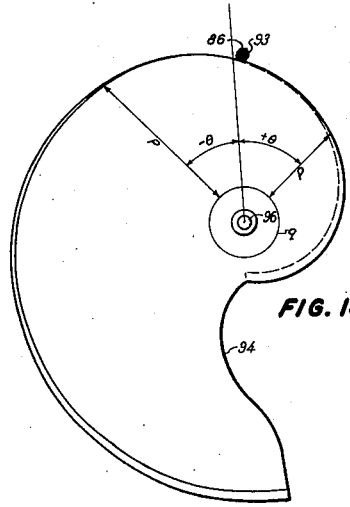
Figure 13 is an elevation view of the cam.

The cam 94 has a bevelled edge, the bevel angle varying to cause the roller 93 to engage the entire edge at any position of the cam. The outline of the surface of the cam nearest the pivot shaft 87 is such as to have a curve defined by the equation:

$$C\theta = \log \frac{1-PL}{PL} \qquad (8)$$

wherein $\theta$ is the angular displacement in degrees of arc of the reading line $k$ from the origin line $n$ on the disc 100 at any setting of the cam, taken positive when the line $k$ is displaced clockwise, as shown, and negative when displaced counterclockwise; $C$ is a constant dependent upon the range of pH values to be indicated on the disc; $L$ is a constant equal to the leverage (i. e., the ratio of the length of the arm 89 to the length of the arm 92) divided by the observing depth; and $P$ is the radial distance from a reference circle of origin $q$ to the curve defining the cam edge, as shown in Figure 13, the distance $P$ being measured along a radius passing through the point of contact of the roller 93 at the particular setting of the cam and disc 99. In the embodiment shown, in which a complete circle on the disc 100 corresponds to 2.0 units of pH, $C=1/180$; also, the leverage is shown to be 2, so that if the observing depth is 5 cm., the constant $L$ equals 0.4, $P$ being expressed in centimeters.

The slide 84, support 83, lever 86 and cam 94 are so constructed that the cup 81 is in its midway position when the line $k$ on the disc 99 is coincident with the line $n$ on the disc 100, $PL$ being in this position equal to 0.50. It follows from this construction that the movable cup 81 will be moved by the rotation of the shaft 96, disc 99 and cam 94, and that the angular displacement of the reading line $k$ from the origin line $n$ will be directly proportional to the first member of the second term of the Equation 4. The graduations of pH on the disc 100 may, therefore, be linear, and the pH may be read directly, the cups being filled and the colors matched with the aid of the eye piece as described above.

For example, in the device illustrated, the cup is positioned so that the ratio of the depth of alkaline to the depth of acid form of the indicators in the cups 68 and 81 is 1.072, and the corresponding value of $\theta$ is $+5°28'$, so that $C$ equals $+0.03$. If bromcresol green is the indicator, the pH of the unknown is 4.73; if bromthymol blue is the indicator, the pH is 7.16.

Figure 16:
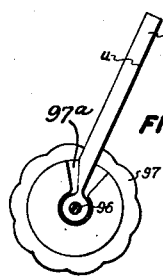
Figure 16 is a sectional view taken on line 16—16 of Figure 11.

To obtain readings for conditions or indicators other than those provided on the concentric circles of the disc 100, an outer ring of equally spaced reading marks $s$ numbered twice from 0 to 9 is provided. The disc 100 is provided with twenty orienting holes 102, uniformly spaced on the circumference of a circle. It is thus possible to orient the disc 100 in any desired position, whereby any even graduation from 0 to 9 can be brought to the top of the disc opposite the reference mark $t$ on the wall 65. An arm 103 having a fiducial edge $u$ is frictionally and rotatably attached to the knob 97, and can be moved through an arc corresponding to the distance between adjacent marks $s$, i. e., about 18°. As shown in Figures 11, 12 and 16, the face of the knob 97 which is adjacent to the disc 99 is cut away at 97a so as to provide a recess for receiving the arm 103. The recess 97a is in the shape of a sector, thereby permitting a limited angular movement between the knob 97 and the arm 103 for adjustment. In the normal operation of the instrument the arm 103 is fixed with regard to the knob 97, moving together with it when the knob is rotated.

To use the outer ring of graduations, the knob 97 is loosened and slid away from the wall 65; the disc 100 is oriented to bring the mark $s$ corresponding to the nearest tenth of the $pK_1$ value of the indicator opposite the mark $t$; the knob 97 is then secured in engagement with the disc 100. With the shaft positioned to bring the reading line $k$ directly over the origin line $n$, the fiducial edge of the arm 103 is set to indicate the $pK_1$ to the nearest hundredth. Units and hundredths of pH may then be read on the outer ring of graduations opposite the fiducial edge of the arm 103 at any position of the knob 97, the relative positions of the knob 97, disc 99, and arm 103 remaining fixed. Thus, in the position shown in Figure 15, the disc 100 is oriented and the arm 103 is adjusted for an indicator having a pK₁ of 10.70. (These settings are also correct for an indicator having a pK₁ of 0.70). The knob 97 is, in this figure, positioned to yield a reading for the pH of the unknown of 11.00. (If the pK₁ of the indicator were 0.70, the pH reading would be 1.00.)

I claim as my invention:

1. A colorimeter comprising a cabinet providing a dark chamber, a first cup within said cabinet having a flat translucent bottom and adapted to contain a sample of unknown color, a translucent ceiling for said cup spaced from the bottom thereof by a predetermined observing depth, a second cup having a flat translucent bottom located adjacent to said first cup within said cabinet and adapted to contain a first color sample, a third vertically movable cup of smaller cross-sectional area than said second cup and telescopically mounted therein, having a flat translucent bottom and adapted to contain a second color sample, a normally stationary translucent plunger of smaller cross-sectional area than said third cup mounted telescopically therein, said third cup and plunger being mounted eccentrically with respect to the second cup and towards said first cup, means for moving said third cup vertically, whereby the ratio of the depth of the color sample in said second cup beneath said third cup to the depth of the color sample in said third cup beneath said plunger can be varied, a graduated scale means operatively connected to said third cup for indicating on said scale a reading R defined by the equation $$R = \log \frac{1-x}{x}$$

where $x$ is the ratio of the depth of the color sample in said third cup to the sum of said depths of the color samples, means for transmitting a first beam of light through the sample in the first cup, means for transmitting a second beam of light through said depths of color samples in the second and third cups and through the said plunger, an eyepiece, and prism means refracting said beams of light into said eye piece.

2. The colorimeter according to claim 1 in which the sum of the said depths of the color samples is equal to the said observing depth.

3. A colorimeter comprising a first cup having a translucent bottom and adapted to contain a first sample provided with means to interpose a predetermined depth of said sample to a substantially vertical first beam of light, telescoping second and third relatively vertically movable cups of different cross-sectional areas having translucent bottoms, located adjacent to said first cup and adapted to contain second and third samples and provided with means to interpose a constant predetermined total depth of said second and third samples to a second substantially vertical beam of light, means for effecting relative vertical motion between said second and third cups, and means comprising a graduated scale operatively connected to said second and third cups for indicating on said scale a reading R defined by the equation $$R = \log \frac{1-x}{x}$$

where $x$ is the ratio of the depth of said third sample interposed to said second beam of light to said constant predetermined depth.

4. A colorimeter comprising a first receptacle having a translucent portion adapted to contain a material of unknown color and arranged to interpose a predetermined observing depth of said solution to a first beam of light, a pair of second and third receptacles having translucent portions adapted to contain two samples of different colors and arranged to interpose said samples to a second beam of light, means for varying the ratio of the depths of said samples interposed to said second beam of light while maintaining the sum of said depths of samples constant, a graduated scale, and means operatively connected to said receptacles for indicating on said scale a reading R defined by the equation $$R = \log \frac{1-x}{x}$$

where $x$ is the ratio of the depth of one of said samples to said sum of the depths.

5. The colorimeter according to claim 4 in which the said sum of the depths of the samples interposed to the second beam of light is equal to the observing depth.

6. In a colorimeter, the combination of two receptacles having translucent portions adapted to contain samples of different colors and arranged to interpose said samples to a beam of light, means for varying the ratio of the depths of said samples interposed to said beam of light while maintaining the sum of said depths of samples constant, a graduated scale, and means operatively connected to said receptacles for indicating on said scale a reading R defined by the equation $$R = \log \frac{1-x}{x}$$

where $x$ is the ratio of the depth of one of said samples to said sum of the depths.

7. The combination according to claim 6 in which the scale and indicating means comprise a scale-carrying body and a reading index associated therewith, said index and scale-carrying body being movable relatively to one another, and arranged by said operative connection to said receptacles to cause the relative movement to be linearly proportional to the depth of one of the said samples interposed to said beam of light, said scale being graduated to yield the reading R opposite said index.

8. In a colorimeter, the combination of two receptacles having translucent portions adapted to contain samples of different colors and arranged to interpose said samples to a beam of light, means for varying the ratio of the depths of said samples interposed to said beam of light while maintaining the sum of said depths constant, a scale carrying body carrying a plurality of scales, and a reading index arranged to permit a reading on any selected scale, said index and scale carrying body being movable relatively to one another and being operatively connected to said receptacles to cause the relative movement along the scales to be linearly proportional to the depth of one of said samples interposed to said beam of light, each of said scales being subdivided by graduations corresponding to equicrescent values of R defined by the equation:

$$R = \log \frac{1-x}{x}$$

where $x$ is the ratio of the depth of one of said samples to said sum of the depths, and successive scales being graduated to different series of values of R.

9. The colorimeter according to claim 6 in which the scale bears equally spaced divisions of R and the means for indicating the reading R thereon comprises a cam operatively connected to said receptacles, a shaft for said cam, the cam surface being shaped to cause the angular displacement of the shaft to be proportional to R.

10. A colorimeter comprising a first receptacle provided with spaced translucent surfaces adapted to interpose a predetermined depth of a first sample to a first beam of light, three telescoping cups provided with translucent bottoms the lower two of which form second and third receptacles for second and third color samples, the uppermost and lowermost of said cups being normally relatively fixed and the intermediate cup being vertically movable, whereby a constant predetermined total depth of said second and third samples may be interposed to a second beam of light passing through the bottoms of said telescoping cups, a vertically movable support for said intermediate cup, a rotatable shaft mechanically connected to said support to effect a simultaneous motion of the support and of the shaft, and a scale and reading index operatively connected to said shaft graduated to yield a reading R on the scale defined by the equation $$R = \log \frac{1-x}{x}$$

where $x$ is the ratio of the depth of said third sample interposed to said second beam of light to said constant predetermined total depth.

11. The colorimeter according to claim 10 in which the shaft is connected to the movable support so as to cause its angular position and the displacement of the index with respect to the scale to be linearly proportional to the vertical position of said intermediate cup.

12. The colorimeter according to claim 10 in which the scale bears equally spaced graduations, said scale and index being operatively connected to said support to cause the displacement of the index with respect to the scale to be proportional to the logarithm of said ratio.

13. A colorimeter comprising a first receptacle provided with spaced translucent surfaces adapted to interpose a predetermined depth of a first sample to a first beam of light, a pair of telescoping cups provided with translucent bottoms, forming second and third receptacles for second and third color samples, a translucent plunger depending into the upper cup and normally fixed relatively to the lower cup and the upper cup being vertically movable relative to the lower cup, whereby a constant predetermined total depth of said second and third samples may be interposed to a second beam of light passing through the bottoms of said telescoping cups, a vertically movable support for said upper cup, a cam mounted on a rotatable shaft, a lever in engagement with a surface of said cam and with said movable support, arranged to position the latter in accordance with the position of said cam, said cam surface being shaped to cause the angular displacement of said shaft to be proportional to the logarithm of the ratio of the depths of said second and third samples interposed to said second beam of light, a scale graduated in equally spaced divisions of R and index means operatively connected to said scale and to said shaft for indicating the reading R on said scale, defined by the equation $$R = \log \frac{1-x}{x}$$

where $x$ is the ratio of the depth of said third sample interposed to the second beam of light to said constant predetermined total depth.

14. A colorimeter comprising a first receptacle provided with spaced translucent surfaces adapted to interpose a predetermined depth of a first sample to a first beam of light, a pair of telescoping cups provided with translucent bottoms, forming second and third receptacles for second and third color samples, a translucent plunger depending into the upper cup and normally fixed relatively to the lower cup and the upper cup being vertically movable relative to the lower cup, whereby a constant predetermined total depth of said second and third samples may be interposed to a second beam of light passing through the bottoms of said telescoping cups, a vertically movable support for said upper cup, a rotatable shaft mechanically connected to said support to effect simultaneous motions of the support and of the shaft such that the angular displacement of the shaft is proportional to the logarithm of the ratio of the depths of said second and third samples interposed to said second beam of light, a normally stationary disc surrounding the axis of said shaft, means for securing said disc in any one of a plurality of angularly spaced positions, a scale on said disc graduated in equally spaced divisions of R and a reading index on said shaft for indicating the reading R on said scale, defined by the equation $$R = \log \frac{1-x}{x}$$

where $x$ is the ratio of the depth of said third sample interposed to the second beam of light to said constant predetermined total depth.

15. The colorimeter according to claim 14 in which the reading index is angularly adjustable with respect to the shaft to increase or decrease the readings on the scale by a predetermined quantity.

16. In a colorimeter, the combination of two receptacles having translucent portions adapted to contain samples of different colors and arranged to interpose said samples to a beam of light, means for varying the ratio of the depths of said samples interposed to said beam of light while maintaining the sum of said depths equal to a distance A, a dial operatively connected to said receptacles to have an angular displacement which is proportional to B, the depth of one of said samples, a scale on said dial calibrated in successive values of R by the equation:

$$R = \log \frac{x}{1-x}$$

where $x$ is the ratio of B to A for any position of the dial and R is the magnitude of the reading for that position of the dial.

17. In a colorimeter, the combination of a rotatable shaft, a cam mounted on said shaft having a surface defined by the equation:

$$C\theta = \log \frac{1-PL}{PL}$$

where C and L are constants, $\theta$ is the angle between a radial line of origin and a radius from the cam axis to the surface, and P is the distance between a reference circle concentric with the shaft and said cam surface measured along said radius, a pair of receptacles having translucent portions adapted to contain samples of different colors and arranged to interpose varying depths of said samples to a beam of light, and means operatively in engagement with said cam surface for varying one of said depths in accordance with said cam surface as the shaft is rotated.

WILFRED F. LANGELIER.

Certificate of Correction

Patent No. 2,216,976. October 8, 1940.

WILFRED F. LANGELIER

It is hereby certified that errors appear in the printed specification of the above numbered patent requiring correction as follows: Page 2, first column, line 44, in the equation, for "+" before "log" read =; page 4, first column, line 72, for "$K_1=6.8 \times 10.9$" read $K_1 = 6.8 \times 10^{-9}$; and that the said Letters Patent should be read with these corrections therein that the same may conform to the record of the case in the Patent Office.

Signed and sealed this 3rd day of December, A. D. 1940.

[SEAL]

HENRY VAN ARSDALE,
*Acting Commissioner of Patents.*